(12) United States Patent
Jabr

(10) Patent No.: US 7,249,793 B1
(45) Date of Patent: Jul. 31, 2007

(54) COOKING SERVING TONGS

(76) Inventor: Zeina Jabr, P.O. Box 140674, Coral Gables, FL (US) 33114

( * ) Notice: Subject to any disclaimer, the term of this patent is extended or adjusted under 35 U.S.C. 154(b) by 0 days.

(21) Appl. No.: 11/396,324

(22) Filed: Mar. 31, 2006

(51) Int. Cl.
*A47G 21/10* (2006.01)
*A47J 43/28* (2006.01)

(52) U.S. Cl. .................. 294/16; 294/99.2; 30/150; D7/686

(58) Field of Classification Search .......... 294/99.2, 294/3, 7, 9–11, 16; D7/653, 685, 686; 30/324, 30/328, 150
See application file for complete search history.

(56) References Cited

U.S. PATENT DOCUMENTS

| | | | | |
|---|---|---|---|---|
| 2,010,074 A | * | 8/1935 | Fuerst | 30/150 |
| 2,670,234 A | * | 2/1954 | Roop | 294/99.2 |
| 2,674,793 A | * | 4/1954 | Dominick | 30/150 |
| D193,440 S | * | 8/1962 | Vernon | D7/686 |
| 4,707,922 A | * | 11/1987 | Hosak-Robb | 30/322 |
| D299,996 S | | 2/1989 | Tucker et al. | |
| 4,955,971 A | * | 9/1990 | Goulter | 294/7 |
| 5,054,835 A | | 10/1991 | Loechel et al. | |
| 5,601,323 A | | 2/1997 | Kaiser | |
| 6,056,342 A | | 5/2000 | Chan | |
| 6,131,977 A | | 10/2000 | Sacks et al. | |
| 6,536,819 B2 | | 3/2003 | Wang et al. | |
| D491,028 S | | 6/2004 | Claypool et al. | |
| D511,276 S | | 11/2005 | Bertulis | |
| D515,369 S | | 2/2006 | Bertulis | |

* cited by examiner

*Primary Examiner*—Dean J. Kramer
(74) *Attorney, Agent, or Firm*—Quick Patents, Inc.; Kevin Prince

(57) ABSTRACT

The CST is ergonomically designed to facilitate in the cooking, handling, and serving of hot and cold food. It's created for simplifying the procedure of cooking and serving all in one element. The top part of the tongs has a rectangular curved-in spoon structure (24) on one side and a wide curved-in fork structure (26) on the other. The tongs consist of a comfortable, applicable handle (22) that is made of stainless steel, with an elongated oval shaped grip (34) nearly half way toward the middle wrapped around the handle (22) with a silver or gold ring (36) at the top and bottom of the grip (34). The grip (34) comes in all different colors including, gold, silver, ivory or pearl. The handle (22) toward the bottom is U-shaped. The head (38), handle (40), and the oval shaped grip (42) are also shaped into one element with the right and left side of the grip (42) extending outwardly. The entire tongs are made of stainless steel, rubber, plastic, carbon, or silicone.

15 Claims, 10 Drawing Sheets

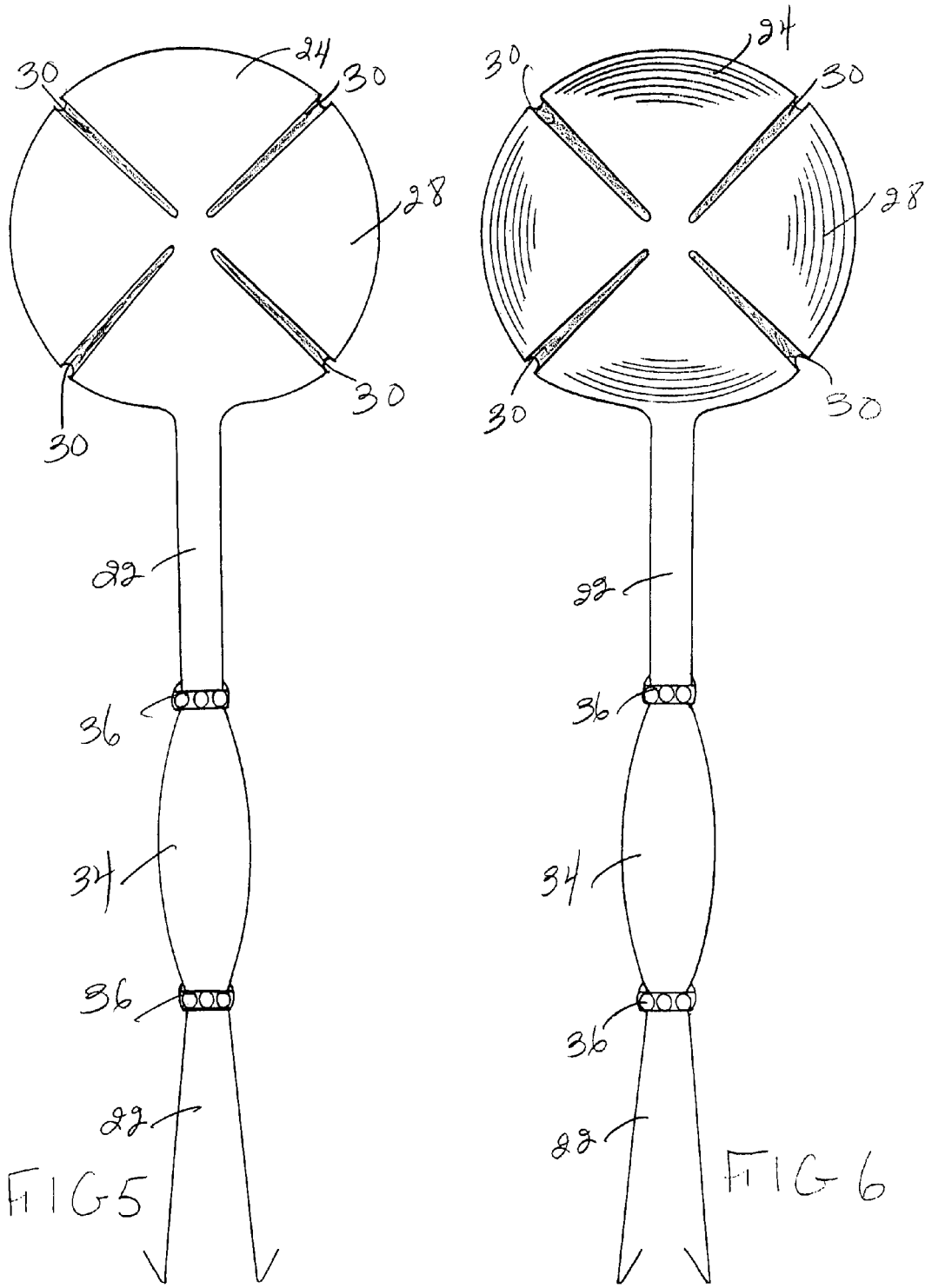

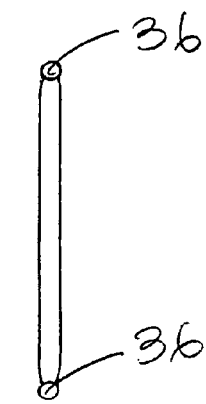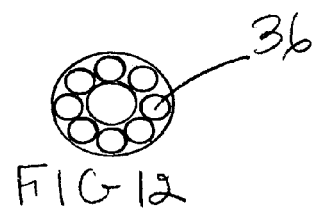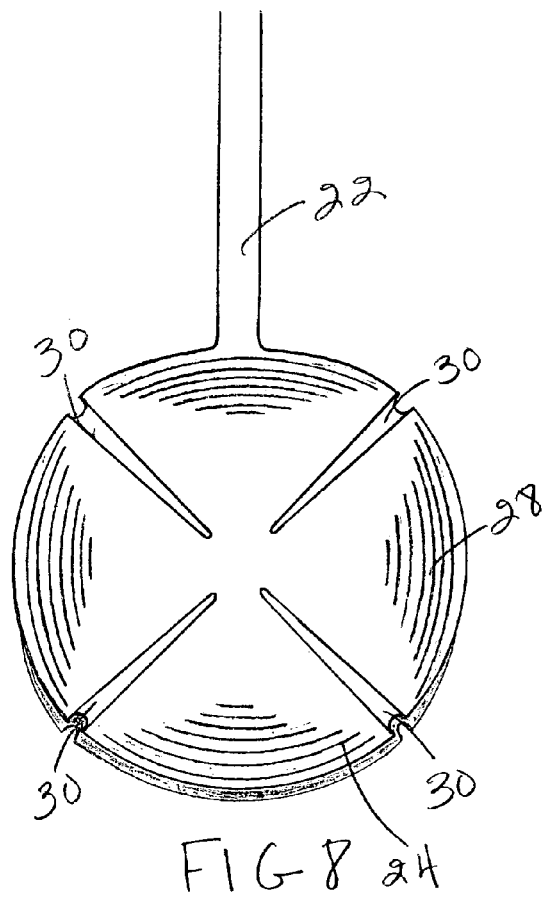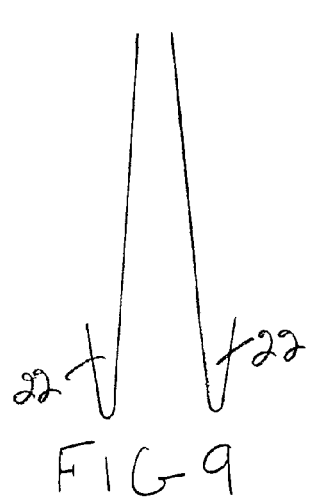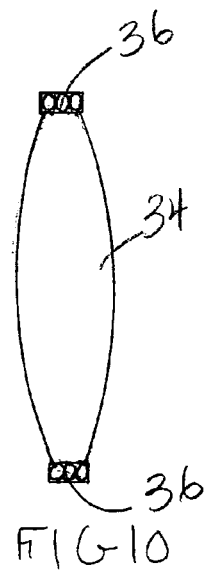

COOKING SERVING TONGS

CROSS-REFERENCE TO RELATED APPLICATION

Not Applicable

FEDERALLY SPONSORED RESEARCH

Not Applicable

SEQUENCE LISTING OR PROGRAM

Not Applicable

BACKGROUND OF THE INVENTION

1. Field of Invention

The invention relates to cooking serving tongs (CST) which are used in the cooking and serving process of food by handling the food in a securely and neatly fashion.

2. Prior Art

Inventors created several tongs coming in different shapes and sizes. Tongs were created to assist in the cooking and serving process of food. But, not all tongs were ergonomically and conveniently shaped to serve and handle a wide variety and large pieces of food. Therefore, people become inclined to using different tongs coming in different shapes and sizes.

Whether cooking on the stove, the grill, or serving food, the tongs currently in use for theses purposes suffer from several drawbacks. An example of such barbecue tong is illustrated in U.S. Pat. No. D299,996 issued Feb. 28, 1989. The problem experienced with this prior art is that the head of the tongs are not conveniently shaped, too thin and not wide, long or curved enough to hold on firmly and securely to some large pieces of food, such as, but not limited to; ribs, steaks, kabobs, chicken, and fish. The food handling implement illustrated in Pat. No. 5,054,835 issued Oct. 8, 1991 is not flat enough to use on the stove or the grill. Also, due to the fork's uneven and wide separation of teeth on one arm toward the top, the tongs will not securely and neatly handle rice, vegetables, fruits, sweets, salads, and other similar items. The cooking tong apparatus in U.S. Pat. No. 5,601,323 issued Feb. 11, 1997 is not practical enough to cook and serve the variety of food mentioned above do to its wide separation of teeth and its inability to grab on to the food in a securely and neatly fashion. and The tongs assembly in U.S. Pat. No. 6,131,977 issued Oct. 17, 2000 is not conveniently designed, nor the plates of the tongs are long, wide, or curved enough to serve other kinds of food either, including but not limited to; rice, pasta, vegetables, fruits, sweets and salads. Therefore, people become inclined to using other utensils. The Multi-purpose tongs in U.S. Pat. No. 6,056,342 issued May 2, 2000 is not ergonomically designed in a way that it dose not give you a comfortable grip of the item nor allow you to hold on securely and neatly to large items due to its short handles and narrowly shaped plates toward the top of the tongs. In U.S. Pat. D491,028 S issued Jun. 8, 2004, due to the wide separation between the plates, this type of tongs will not securely and conveniently hold on to some pieces of food such as; meats, fish, rice, pasta, vegetables, fruits, sweets, and salads. The tongs in U.S. Pat. No. 6,536,819 B2 issued Mar. 25, 2003, D511,276 S issued Nov. 8, 2005, and D515,369 S issued Feb. 21, 2006 also suffer from several inconveniences; not holding on securely to a variety of food similar to the ones mentioned above.

Prior art does not have a comfortable grip conformed or shaped to your hand while cooking or serving food.

Prior art is not convenient enough that people must purchase different tongs to fulfill their different cooking and serving needs.

In addition, both, the current cooking or serving tongs, are not practical, do not look appropriate, elegant or aesthetic enough to use at a nice or formal dining table.

Currently, there are no tongs well suited for all the various items of food, whether for cooking them on the grill, the stove or serving them at the table.

For all the above reasons, a practical, convenient, conserving, and an aesthetic item, is desired such as; the all in one cooking and serving tongs.

OBJECTS AND ADVANTAGES

Several objects and advantages of the present invention are:

(a) The cooking serving tongs is ergonomically designed to facilitate in the cooking and serving process of food.

(b) The cooking serving tongs is conveniently shaped to serve different cooking and serving needs.

(c) The CST simplifies the procedure of cooking and serving all in one element with a comfortable, applicable handle that is made out of stainless steel, ceramic, rubber, plastic, carbon, or silicone.

(d) There is a grip situated nearly half way toward the middle of the handle to give the user a more secure and confident feeling while handling different kinds of food.

(e) The CST is even more convenient than any prior art for serving different items by grasping on to the food in a securely and neatly fashion without creating a mess around the stove, plate or on the table.

(f) The CST serves many purposes and needs including cooking on the stove or the grill, as well as serving different kinds of food at the table including but not limited to salads, meats, rice, pasta, vegetables, sweets, and fruits.

(g) Whether cooking on the stove or the grill, the top of the cooking tongs is wide and long enough to hold on securely to some large pieces of food, such as, but not limited to; steaks, chicken, fish, ribs, kabobs, and other large pieces of food.

(h) It is designed conveniently, and deep enough to serve other kinds of food including but not limited to; rice, pasta, vegetables, fruits, sweets and salads.

(i) The CST is ergonomically designed to facilitate in the cooking, handling, and serving of hot and cold food.

(j) The CST is aesthetically designed to serve both as a cooking and serving item.

(k) The CST is convenient enough that people will not be in need of purchasing different tongs to fulfill most of their different cooking and serving needs.

(l) Also, the invention for cooking serving tongs is practical, looks more appropriate, elegant and aesthetic enough to use at a nice or formal dining table or gathering.

BRIEF SUMMARY OF THE INVENTION

The CST is ergonomically designed to facilitate in the cooking and serving process of food comprising of a rectangular curved-in spoon and a rectangular curved-in fork structure toward the top of the item with 1.5 to 3.0 inches in width. The entire length of tongs will vary between 12.5 to 14.5 inches. The CST serves many purposes and needs including cooking on the stove or the grill, as well as serving different kinds of food at the table including but not limited to; salads, pasta, meats, rice, vegetables, sweets, and fruits. With the width and curve of the fork teeth on one arm and the width and curve of the spoon on the other, the CST is even more convenient than any prior art for serving different items by grasping on to the food in a securely and neatly fashion without creating a mess around the stove, plate or on the table. The CST is aesthetically and ergonomically designed to serve both your cooking and serving needs.

BRIEF DESCRIPTION OF THE DRAWING

The advantages and other features of the invention will be briefly described below in connection with the accompanying drawings in which:

FIG. 5 is a front view of the rectangular shaped-in spoon structure that is part of the cooking serving tongs.

FIG. 6 is a back view of the rectangular shaped-in spoon structure that is part of the cooking serving tongs.

FIG. 8 is a top view of the rectangular shaped-in spoon structure that is part of the cooking serving tongs.

FIG. 9 is a bottom view of the cooking serving tongs.

FIG. 10 is a front view of the grip designed nearly half way toward the middle of the handle of the cooking serving tongs.

FIG. 11 is a side view of the grip designed in the middle of the cooking serving tongs.

FIG. 12 is a top view of the ring that is wrapped around the grip of the cooking serving tongs.

FIG. 13 is a face view of the ring that is wrapped around the grip of the cooking serving tongs.

DRAWINGS—REFERENCE NUMERALS

Figure 1:
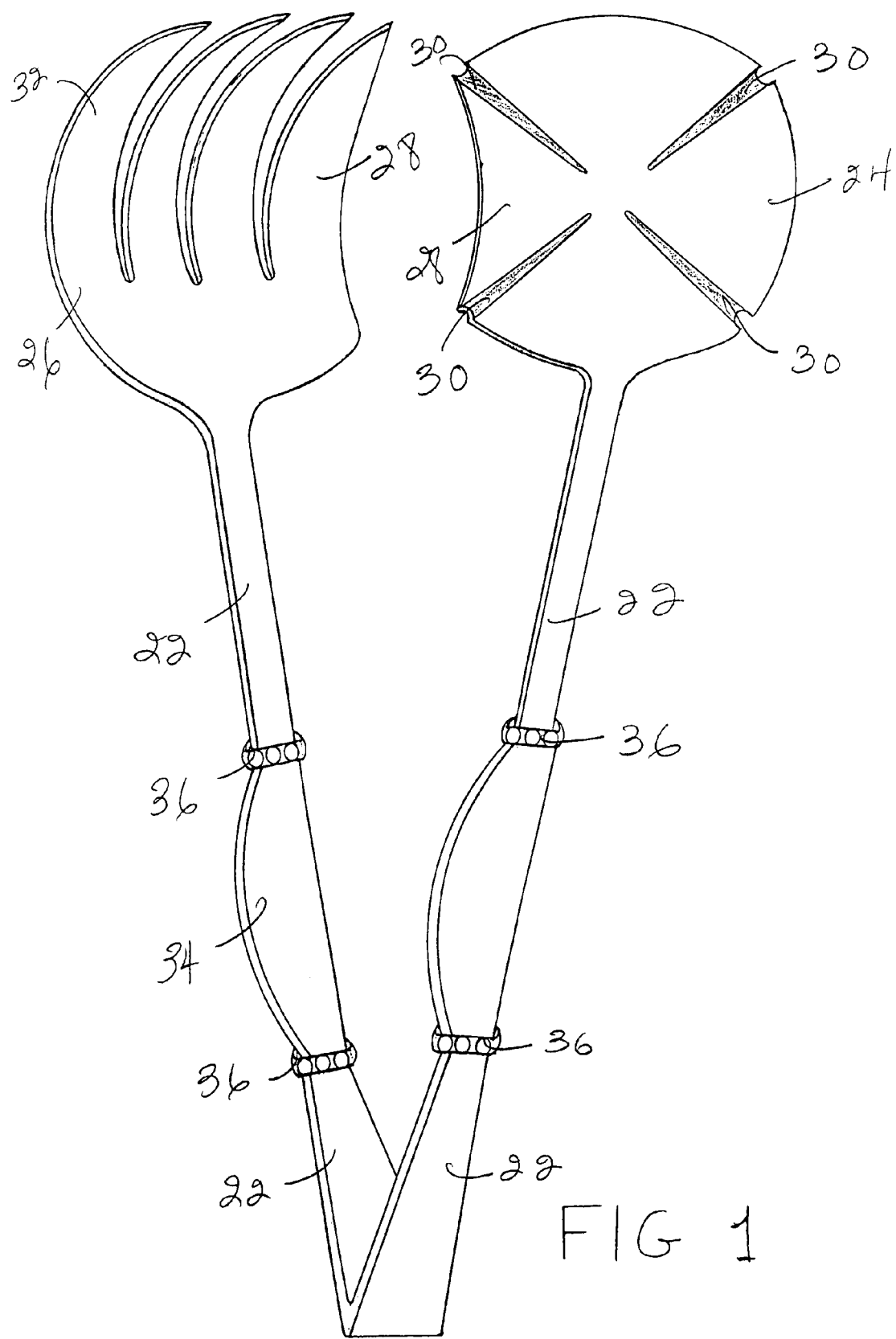
FIG. 1 is a perspective view of the cooking serving tongs with the front of the rectangular curved-in fork, and the back of the rectangular curved-in spoon structure showing.

| | |
|---|---|
| 22 handle | 24 shaped-in spoon |
| 26 shaped-in fork | 28 tilt or depth |
| 30 protruding lines | 32 teeth |
| 34 grip | 36 ring |
| 38 head | 40 handle |
| 42 grip | 44 protruding squares |
| 46 waved polygon | 48 circles |
| 50 small wave | 52 elongated wave |
| 54 shaped-in spoon | |

DETAILED DESCRIPTION OF PREFERRED EMBODIMENTS

The CST comprises of an elongated U-shaped handle 22 with a rectangular shaped-in spoon 24 and fork 26 structure toward the top of the tongs with one side facing the other. The width of the shaped-in spoon 24 and fork 26 varies between 1.5 to 3.0 inches.

The length of the shaped-in spoon 24 and fork 26 varies between 2.0 to 4.0 inches.

The thickness of the shaped-in spoon 24 and fork 26 varies between 0.10 and 0.20 inch.

The shaped-in spoon 26 and fork structure 24 toward the top of the tongs varies between 0.20 to 0.50 inch in depth or tilt 28.

The handle 22 above the grip 34 is 3–4 inches in length, 0.25 inch in width, and 0.10–0.20 inch in thickness.

The handle 22 below the grip 34 is 2–3 inches in length, 0.25–0.50 inches in width and 0.10–0.20 inches in thickness.

The entire length of tongs varies between 12.5 to 14.5 inches.

The first arm has a rectangular shaped-in spoon structure 24 toward the top with four protruding lines 30 one extending from each corner of the spoon 24 and meeting nearly half way toward the middle of the spoon 24, with the second arm facing the first, the shaped-in fork 26 structure has four wide curved-in teeth 32.

The grip 34 has an elongated oval-shaped structure with a silver or gold ring 36 toward the top and bottom of the grip 34.

The grip 34 comes in all different colors including, gold, silver, ivory or pearl.

The grip 34 is securely wrapped around the handle 22 and situated between the upper and lower part of the handle 22.

The grip 34 varies between 3.0 to 4.0 inches in length and 3.0 to 3.5 inches in width wrapped around.

The grip 34 is made out of stainless steel, ceramic, rubber, plastic, carbon, or silicone.

The lower and upper part of the tongs above and below the grip 34 is made out of stainless steel.

Figure 15:
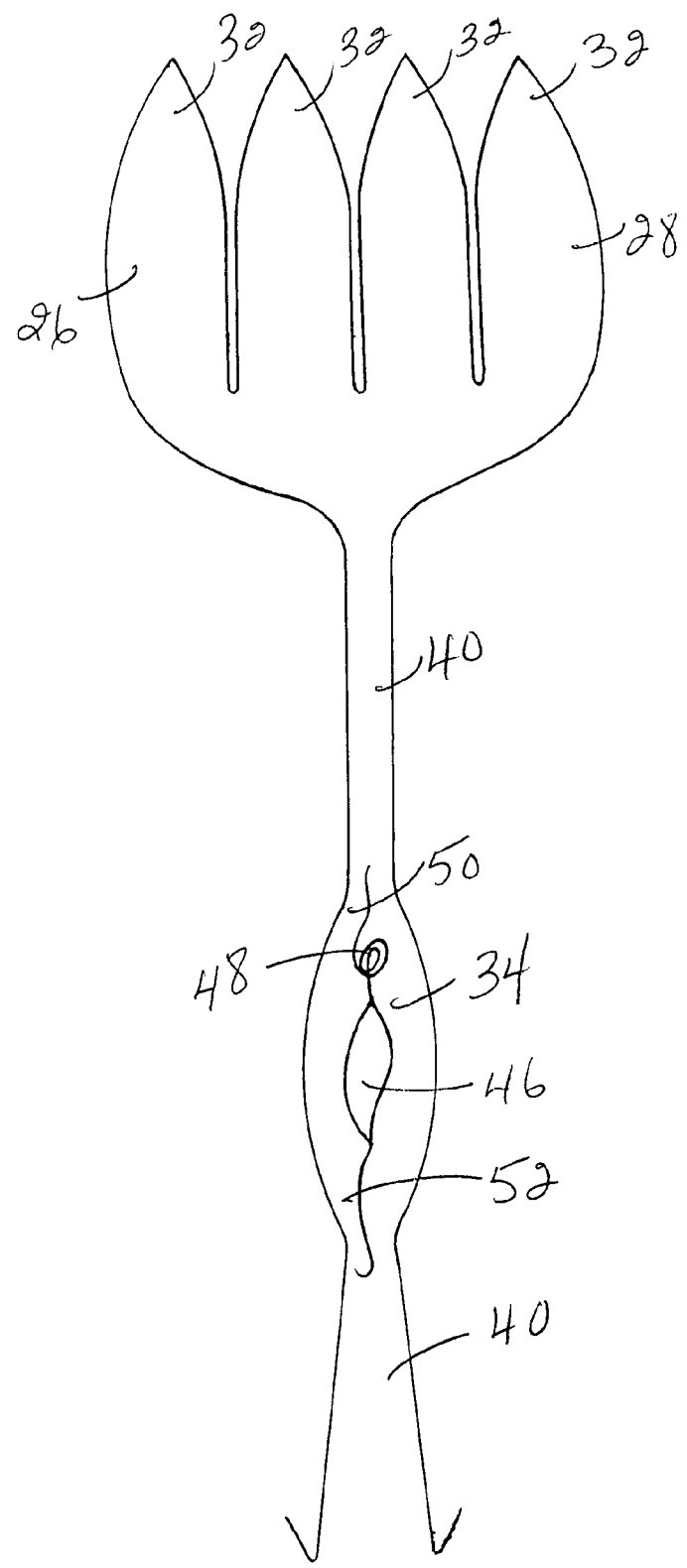
FIG. 15 is a face view of the shaped-in fork structure with the grip, top and bottom of the tongs all shaped into one single element.
Figure 16:
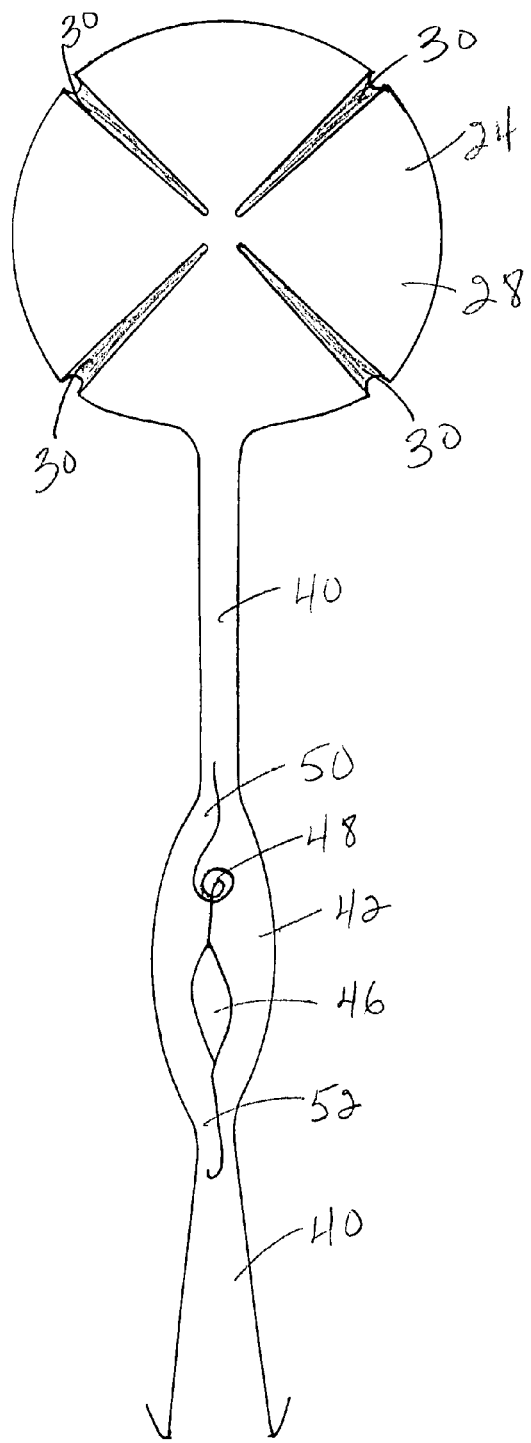
FIG. 16 is a face view of the shaped-in spoon structure with the grip, top and bottom of the tongs all shaped into one single element.
Figure 17:
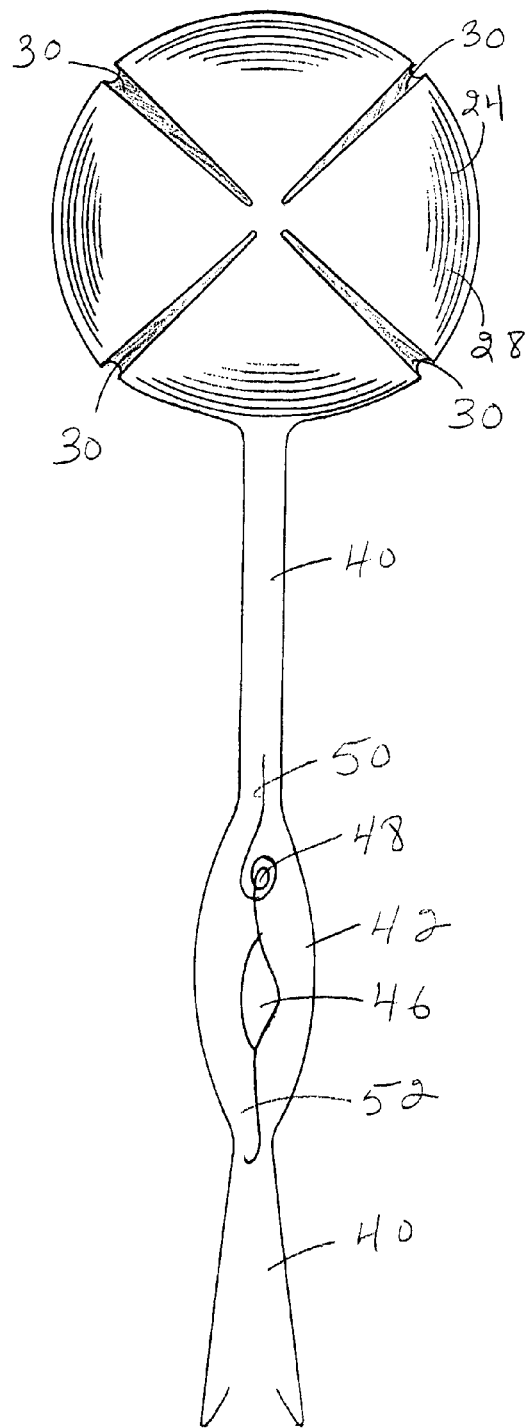
FIG. 17 is a back view of the shaped-in spoon structure with the grip, top and bottom of the tongs all shaped into one single element.
Figures 18, 19, 20:
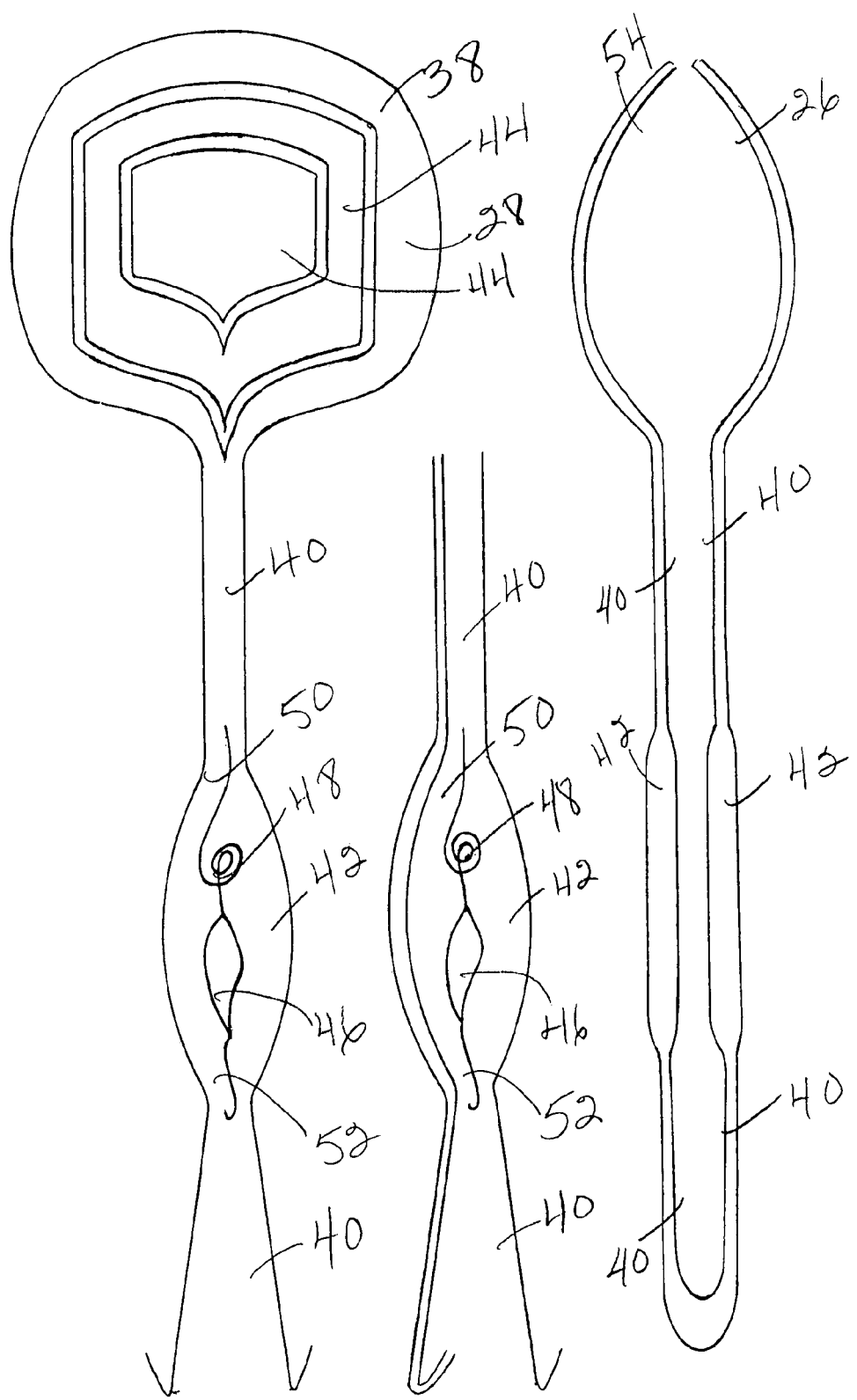
FIG. 18 is a face view of the shaped-in spoon structure with two protruding squares designed one inside the other toward the middle of the plate, shaped by a wide short V hanging down toward the middle bottom of each square.
FIG. 19 is a side view of the shaped in-spoon handle of the cooking serving tongs.
FIG. 20 is a side view of the cooking serving tongs with the grip, top and bottom of the tongs all shaped into one single element.

Alternative embodiments are shown in FIGS. 15, 16, 17, 18, 19 and 20; the head 38, handle 40, and an alternate grip 42 of the tongs can all be shaped into one single element, that is, integrally formed, with the grip 42 having an oval-shaped structure nearly half way toward the middle of the handle 40 with the right and left side of the grip 42 extending outwardly.

FIGS. 15, 16, 17, 18, and 19 show the grip 42 with an engraved waved polygon 46, or a protruding waved polygon 46 with two circles 48 one extending out of the other by a small wave 50, and the bottom of the polygon 46 is shaped by a small elongated wave 52 hanging down pointing toward the lower side of the handle 40.

Figure 2:
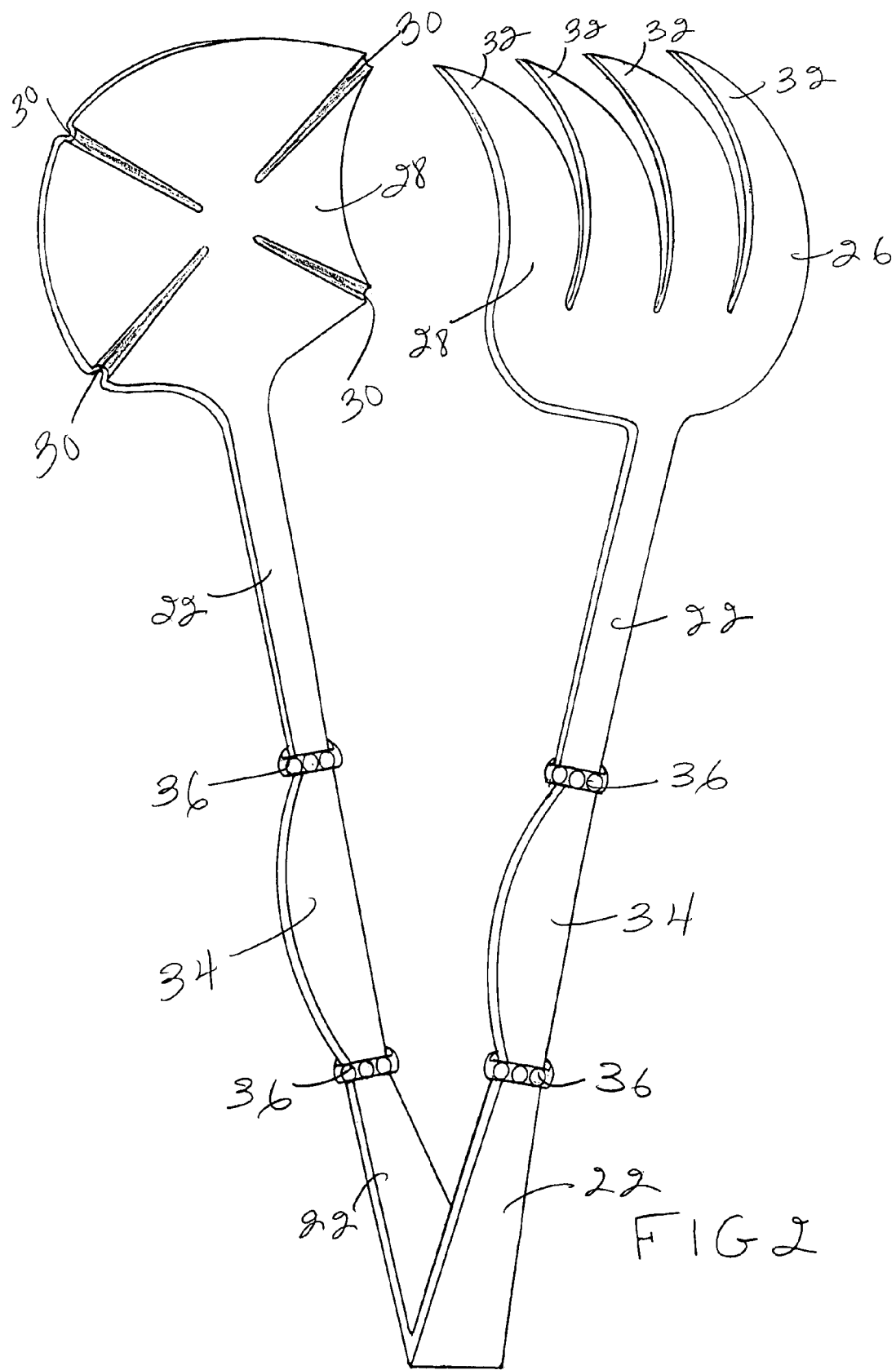
FIG. 2 is a perspective view of the cooking serving tongs with the front of the rectangular shaped-in spoon and the back of the rectangular shaped-in fork structure showing.
Figure 3:
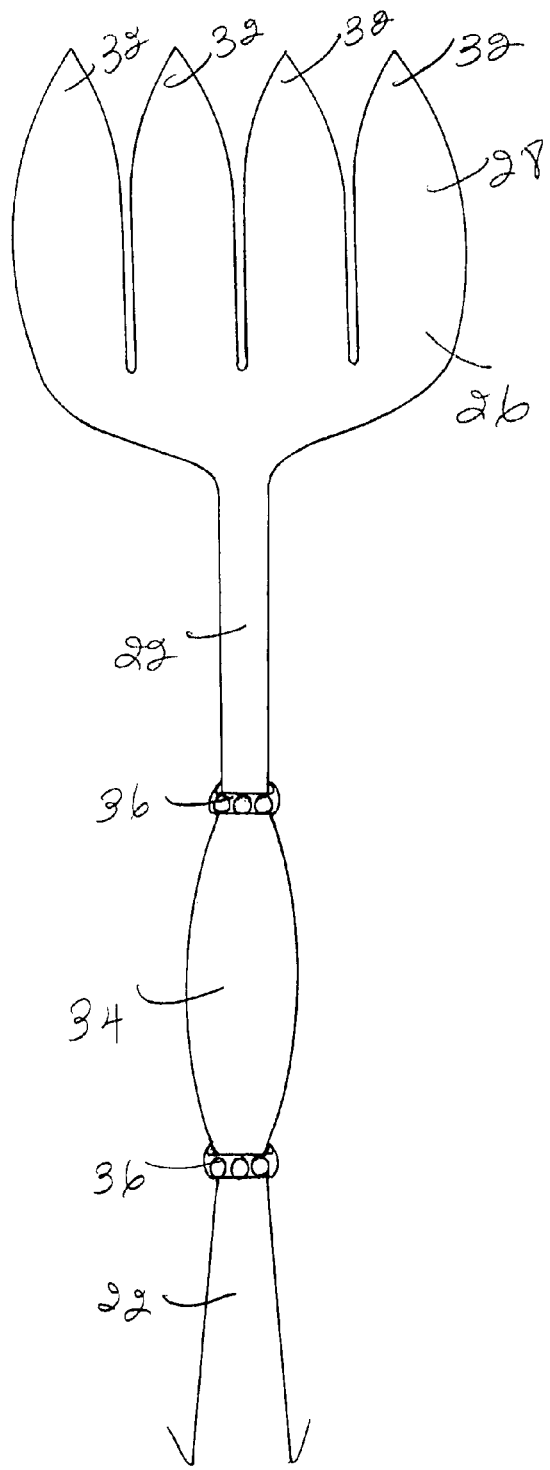
FIG. 3 is a front view of the rectangular shaped-in fork structure that is part of the cooking serving tongs.
Figure 4:
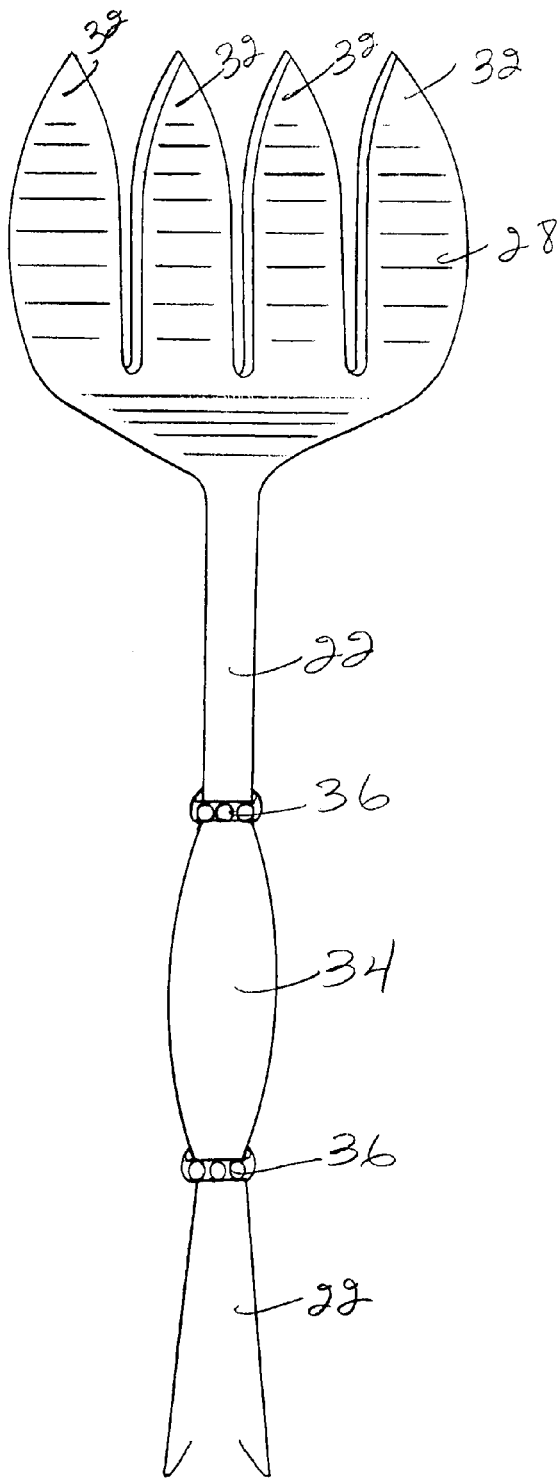
FIG. 4 is a back view of the rectangular shaped-in fork structure that is part of the cooking serving tongs.
Figure 7:
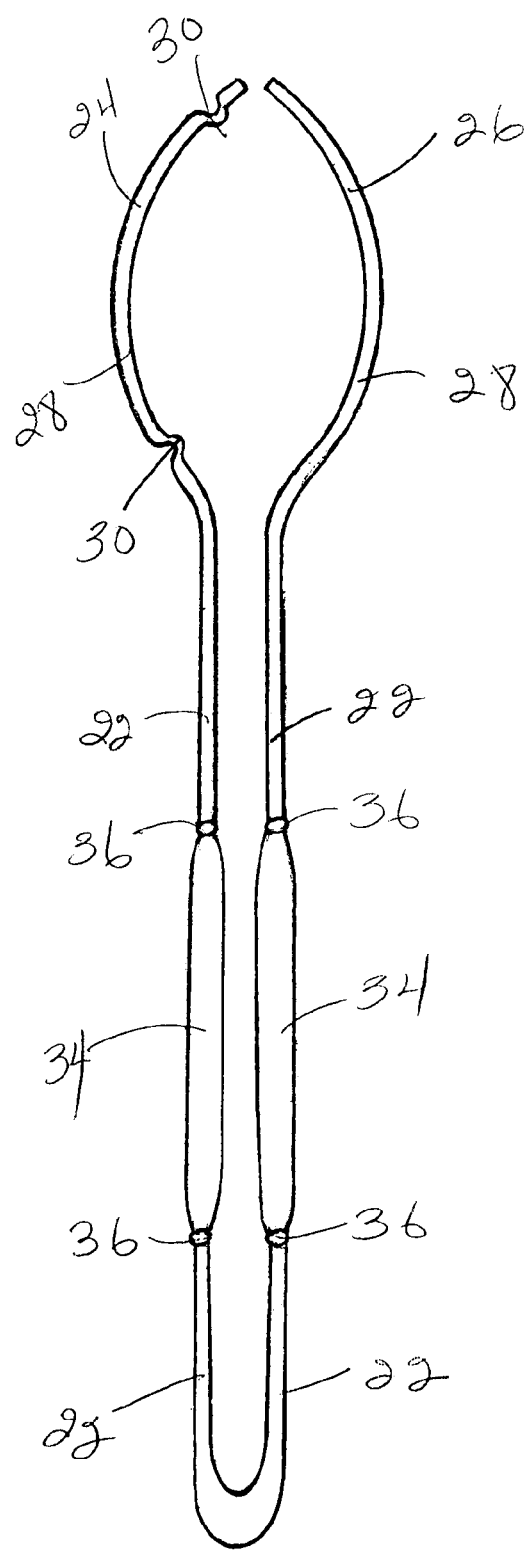
FIG. 7 is a side view of the cooking serving tongs.
Figure 14:
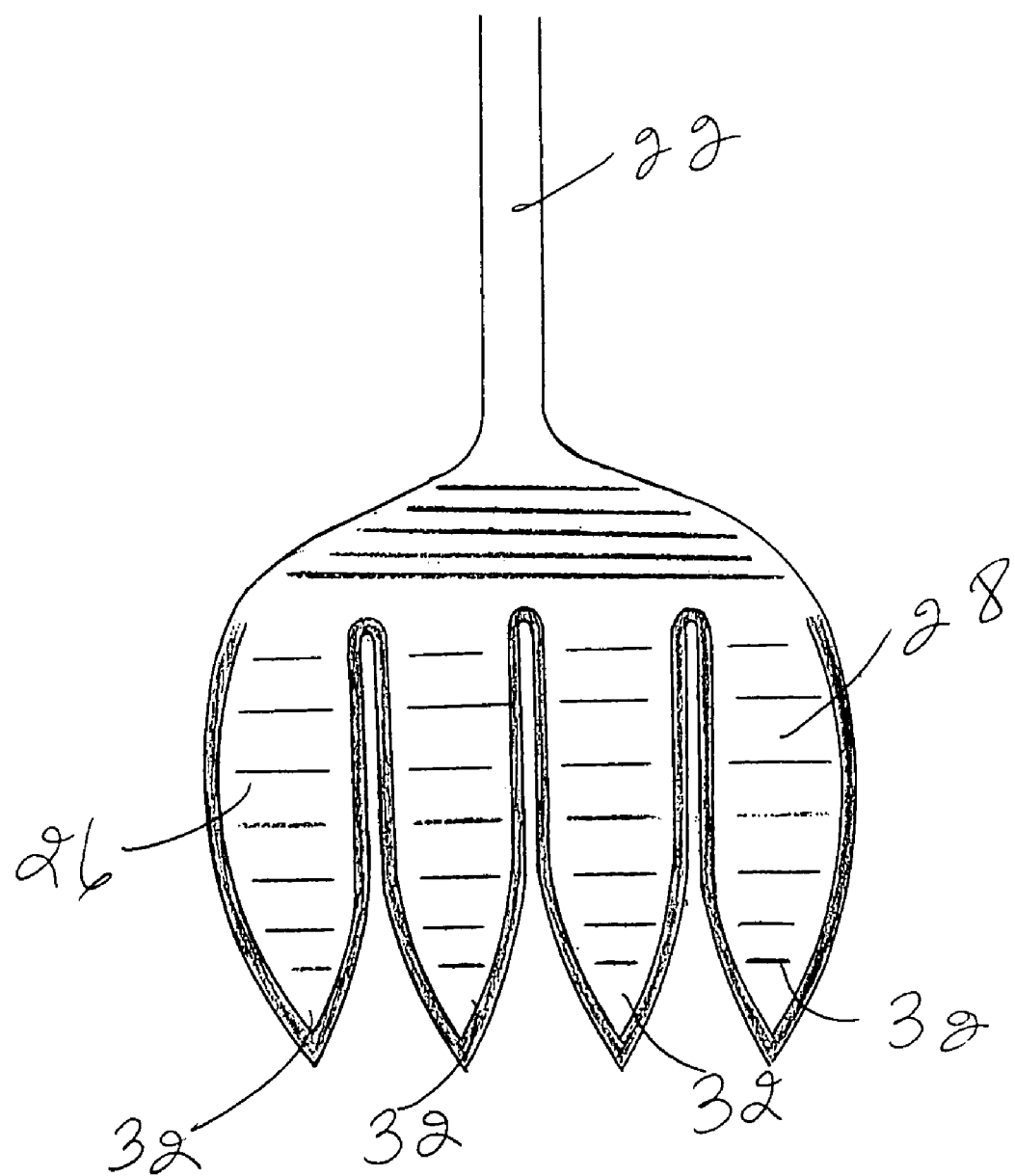
FIG. 14 is a top view of the rectangular curved-in fork structure of the cooking serving tongs.

The shaped-in spoon structure 54 toward the top of the tongs shows a different shape than that of FIGS. 1, 2, 5, 6, 8, 16, and 17.

The shaped-in spoon structure 54 toward the head 38 of the tongs consists of protruding squares 44 designed one inside the other toward the middle of the plate, shaped by a wide short V hanging down toward the middle bottom of each square, and pointing down toward the upper side of the handle.

The length of the grip 42 is said to be 3–4 inches in length, and 1–1.5 inches in width and 0.25–0.75 inch in thickness.

The entire tongs are made out of stainless steel, ceramic, rubber, plastic, carbon, or silicone.

ADVANTAGES

From the description above, a number of advantages of my cooking serving tongs become evident:

(a) The use of the cooking serving tongs simplifies the procedure of cooking and serving all in one element.

(b) The grip situated nearly half way toward the middle of the handle is conformed to your hand giving you a secure and confident feeling for handling different kinds of food.

(c) The CST grasps the food securely and neatly without creating a mess around the stove, plate or on the table.

(d) The CST serves many purposes and needs including cooking on the stove, the grill, and as a serving item.

(e) The top of the cooking tongs is wide and long enough to hold on securely and firmly to large pieces, such as, but not limited to; steaks, chicken, fish, ribs, kabobs, and other large pieces of food.

(f) It is conveniently designed, and deep enough to serve other kinds of food including but not limited to; rice, pasta, vegetables, fruits, sweets and salads.

(g) The CST facilitates in the cooking, handling, and serving of hot and cold food.

(h) The CST is aesthetically designed to serve as a cooking and a serving item at the table.

(i) The CST is convenient enough that people will not be in need of purchasing different tongs to fulfill most of their cooking and serving needs.

(j) Also, the invention for cooking serving tongs is practical, aesthetically designed; looks more appropriate and elegant to use at a nice or formal dining table or gathering.

CONCLUSION, RAMIFICATIONS, AND SCOPE

The advantages of using the cooking serving tongs are clearly described to the reader.

Grasping the food in a securely and neatly fashion is of a great advantage to the user.

The cooking serving tongs is practical and serve most of your cooking and serving needs.

It serves a variety of food such as; meats, fish, vegetables, pasta, rice, fruits and sweets.

Having a comfortable grip conformed to your hand gives a comfortable and a secure feeling while cooking and serving with such item.

It looks elegant and appropriate to use at a casual or formal dining table.

The different colors of the grip give the item a stylish taste and the user a variety to choose from.

The gold or silver ring on top and bottom of the grip adds to the elegancy of the item.

While all parts of the tongs could be shaped into one single element, the item can consist of a variety of material other than stainless steel to help protect your cooking items from scratches and other types of damages.

Although the description above contains many specificities, these should not be construed as limiting the scope of the invention but as merely providing illustrations of some of the presently preferred embodiments of this invention. For example, the grip can be wrapped around the handle or all shaped into one single element. The rectangular shaped-in spoon toward the top of the tongs may also have an oval shaped structure.

What is claimed as new and desired to be protected under the U.S. patent law is:

1. A cooking serving tongs comprising a rectangular curved-in spoon having one arm and a rectangular curved-in fork structure having another arm, one arm facing the other, the fork consisting of four wide teeth, the spoon having four protruding lines on a front, inwardly grooved in from a back with one line extending from each of four corners of the spoon and terminating nearly half-way toward the middle of the spoon, an elongated oval shaped grip sandwiched near the middle of each arm, a U-shaped handle connecting each arm below each grip.

2. The tongs of claim 1, wherein the spoon, the fork, and each arm thereof are composed of stainless steel.

3. The tongs of claim 2, wherein each grip is composed of stainless steel.

4. The tongs of claim 2, wherein each grip is composed of ceramic.

5. The tongs of claim 2, wherein each grip is composed of rubber.

6. The tongs of claim 2, wherein each grip is composed of plastic.

7. The tongs of claim 2, wherein each grip is composed of carbon.

8. The tongs of claim 2, wherein each grip is composed of silicone.

9. The tongs of claim 2, wherein the color of each grip is taken from the following set of colors: gold, silver, ivory or pearl.

10. The tongs of claim 1, wherein the U-shaped-handle below the grip is composed of stainless steel.

11. The tongs of claim 10, wherein the top of each grip is encircled by a ring composed of stainless steel.

12. The tongs of claim 10, wherein the bottom of each grip is encircled by a ring composed of stainless steel.

13. The tongs of claim 10, wherein the top of each grip is encircled by a ring composed of either gold or silver.

14. The tongs of claim 10, wherein the bottom and top of each grip is encircled by a ring composed of either gold or silver.

15. The tongs of claim 1, wherein the tongs are integrally formed of a material taken from the following set of materials: stainless steel, rubber, plastic, carbon, or silicone.

* * * * *